United States Patent [19]

Okonogi et al.

[11] Patent Number: 4,571,338

[45] Date of Patent: Feb. 18, 1986

[54] METHOD FOR PREPARING MILK SHAKE BEVERAGE

[75] Inventors: Shigeo Okonogi, Tokyo; Kunisuke Kuwahara, Yokohama; Katsushige Tanaka, Hachioji; Keiji Iwatsuki, Yokohama; Toshiaki Shimokawa; Masaru Matsuzaki, both of Tokyo, all of Japan

[73] Assignee: Morinaga Milk Industry Co., Ltd., Tokyo, Japan

[21] Appl. No.: 620,348

[22] Filed: Jun. 13, 1984

[30] Foreign Application Priority Data

Jul. 13, 1983 [JP] Japan .................. 58-126145

[51] Int. Cl.[4] .................. A23C 3/02; A23C 9/154
[52] U.S. Cl. .................. 426/324; 426/329; 426/330.2; 426/330.3; 426/568; 426/569; 426/575; 426/399; 426/584
[58] Field of Search .............. 426/399, 400, 401, 407, 426/393, 330.2, 330.3, 329, 565, 569, 324, 568, 575, 584

[56] References Cited

U.S. PATENT DOCUMENTS

| | | | |
|---|---|---|---|
| 2,493,324 | 1/1950 | Steiner | 426/566 |
| 2,823,129 | 2/1958 | Steinitz | 426/654 |
| 2,910,364 | 10/1959 | Powley | 426/330.3 |
| 3,084,052 | 4/1963 | McLaughlin | 426/393 |
| 3,385,714 | 5/1968 | Smith | 426/407 |
| 3,479,187 | 11/1969 | Arbuckle | 426/569 |
| 3,666,497 | 5/1972 | Stewart et al. | 426/330.2 |
| 3,684,523 | 8/1972 | McGinley et al. | 426/330.2 |
| 3,800,036 | 3/1974 | Gabby et al. | 426/566 |
| 3,845,231 | 10/1974 | Nagasawa et al. | 426/393 |
| 3,914,440 | 10/1975 | Witzig | 426/565 |
| 3,996,389 | 12/1976 | Osborn | 426/565 |
| 4,081,566 | 3/1978 | Haber | 426/578 |
| 4,242,367 | 12/1980 | Igoe | 426/565 |
| 4,282,262 | 8/1981 | Blake | 426/401 |
| 4,374,155 | 2/1983 | Igoe et al. | 426/569 |
| 4,421,778 | 12/1983 | Kahn et al. | 426/565 |
| 4,434,186 | 2/1984 | Desia | 426/565 |
| 4,479,973 | 10/1984 | Holley | 426/578 |

FOREIGN PATENT DOCUMENTS

1061166  8/1979  Canada .................. 426/565

*Primary Examiner*—Steven Weinstein
*Attorney, Agent, or Firm*—Jordan and Hamburg

[57] ABSTRACT

Method for preparation of milk shake beverage contained in can, bottle, paper carton or the like with a sufficient head space so that when shaking the container desirable volume of foam is obtained. Guar gum, kappa carrageenan and xanthan gum, which are well known as stabilizer for such beverage, are added to liquid mixture in the respectively specified amount ratio so as to make it possible to sterilize at a temperature of 135° to 150° C. for 2 to 5 seconds for long shelf life without causing undesirable coagulation and decreasing volume of foam.

1 Claim, 1 Drawing Figure

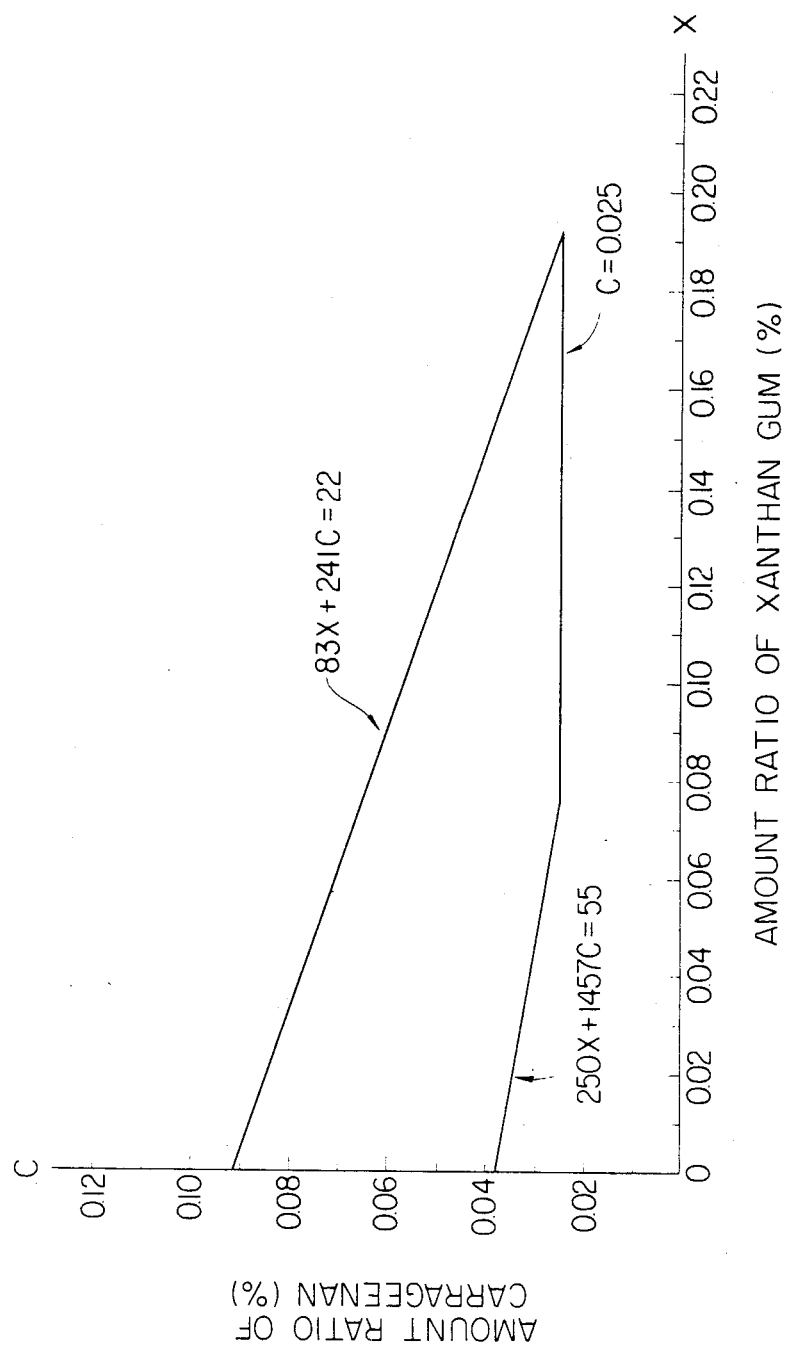

4,571,338

METHOD FOR PREPARING MILK SHAKE BEVERAGE

BACKGROUND OF THE INVENTION

Milk shake has been served for a long time at coffee shops and fastfood shops. It is as well known prepared by adding egg, sugar, flavor, such as vanilla, water and the like to milk and shaking the liquid mixture to be foamy. Recently, coffee, chocolate, strawberry, melon or like syrup is often added.

The preparation is not so easy at home. Even at the shops it is not economically efficient to prepare such drink order by order.

Thus, powdery or granular mixes containing foaming agent have been proposed to readily prepare milk shake or similar foamy drink as shown in Japanese Early Opened Patent Application Gazettes 80460/79 and 107566/79 and Japanese Patent Publication Gazette 52826/82. Such mixes, however, are not satisfactory in that it still necessitates some time and instrument for dissolving in water or milk, that solubility is not always good, that disappearance of foam is caused for short time after shaking and/or that foam is observed only on the surface of liquid phase but not in the liquid phase.

Recently canned or bottled milk shake or similar beverage with a head space of 20–40% by volume has been proposed and marketed. When shaking the container containing the liquid mixture, necessary foam is caused so that the milk shake beverage is poured into the glass or cup to be taken. Such milk shake beverage packaged in a container so as to have the head space of 20–40% by volume is very useful for readily serving the foamy drink such as milk shake and has recently been marketed in a considerable amount.

However, these drinks must be held in the cold storage and cannot be preserved for so long time such as a few or several months, since "sterilization" at a temperature higher than 100° C. above all in the range of 135°–150° C. of milk shake readily deteriorates milk contained therein. In addition thereto, foam stability is not always good.

On the other hand, it has been for a long time in public knowledge to use guar gum, xanthan gum, carrageenan and the like as "stabilizer" for the milk contained drinks and foods inclusive of milk shake, soft serve frozen desserts. Such stabilizers are known as being able to prevent whey separation. For instance Japanese Early Opened Patent Application Gazette 102354/80 and U.S. Pat. No. 4242367 discloses the stabilizer consisting of 53–68%, preferably 62.63% guar gum, 20–35%, preferably 25.95% xanthan gum, 9–13%, preferably 10.52% carrageenan and 0–5%, preferably 0.90% (all by weight) locust bean gum to be used in the amount of 0.14–0.25% (by weight) for milk shake, soft serve frozen desserts and the like in order to prevent separation as referred to above.

SUMMARY OF THE INVENTION

One of the objects of the invention is to provide a method for preparation of milk shake beverage contained in the container with leaving a sufficient head space and having considerably longer shelf life without causing coagulation and undesirable increase of viscosity and with keeping good taste.

The other object of the invention is to provide such method for preparing milk shake beverage of satisfactory overrun and volume of foam only with shaking the container containing said milk shake beverage.

The further object is to provide such method for preparing milk shake beverage of which overrun and volume of foam can be previously set to the respectively desired value.

The still other object is to provide such method for preparing milk shake beverage causing no deterioration of milk proteins despite of subjecting to sterilization at a considerably high temperature.

The still further object is to provide such method for preparing milk shake beverage capable of stably keeping foam once formed by shaking.

Said and other objects as well as various advantages can be attained according to the invention by adding guar gum, xanthan gum and kappa (herein-after referred to as "carrageenan") carrageenan respectively in a specific amount range to the liquid mixture of milk shake beverage.

DETAILED DESCRIPTION OF THE INVENTION

Respectively suitable amount of milk constituent, sweetener, buffer salt are added in water to be mixed, to, which hot water of 40°–70° C. dissolved with guar gum, carrageenan and xanthan gum respectively in the amount to be specified hereafter is added. Then flavor, coloring agent, and foaming agent as occasion demands are added together with water so as to prepare a desired amount of liquid mixture, which is then subjected to sterilization at a temperature of 135°–150° C. for 2–5 seconds. The sterilizer may be any of indirectly heating device (plate type, tube type) and directly heating device as used in the milk plant. Sterilized mixture is aseptically homogenized by means of the homogenizer as used in the milk plant, which is then aseptically filled in the container such as can, bottle, and paper carton. Amount of the filled liquid mixture is preferably about 60% by volume.

Milk constituent to be used in the invention may be any of or any combination of raw milk, skim milk, powdered whole milk and powdered skim milk so that milk fat content is in the range of 0–4% by weight and solids not fat content is in the range of 3–14% in the liquid.

Sucrose is used in the amount of 4–10% by weight as a sweetener.

The gums used in the invention are all available in the market. Guar gum is a polysaccharide produced from albumen part of the seed of Guar Cynmopsis tetragonolobus belonging to the pulse family. Carrageenan is a mixture of a plurality of polysaccharides obtained from red seaweed, among which kappa carrageenan is used for the invention. Xanthan gum is a polysaccharide biosynthesized from glucose by Xanthomonas campestris.

Guar gum is to be added in the amount of less than 0.07% to the liquid mixture in the light of the result of the experiments to be referred to hereafter. Carrageenan and xanthan gum are to be added respectively in the amount obtained from the following two equations derived from the experiments to be referred to hereafter with substituting desired numerical values respectively for symbols representing overrun and volume of foam which is measured by shaking final product and allowed standing for 10 min. per 130 ml of the mixture (hereinafter referred to as "volume of foam after 10 min."), in said equations, provided that carrageenan must be used in the amount of at least 0.025% by weight and xanthan gum may be more than 0% by weight.

Said equations are;

$$83X + 241C = 82 \cdot OR \quad (1)$$

$$250X + 1457C = ST \cdot 15 \quad (2)$$

wherein C stands for weight percent of added carrageenan to the mixture and is at least 0.025, X stands for weight percent of added xanthan gum to the mixture and is at least 0, OR stands for volume percent of desirable overrun in final product and is at least 60, and ST stands for milliliter of foam which is measured by shaking final product and allowed standing for 10 minutes per 130 ml of the mixture and is at least 70.

For instance when milk shake beverage of 60% overrun and 120 ml of foam (relative to 130 ml liquid mixture) is intended, said values 60 and 120 are to be substituted respectively for OR and ST in said equations;

$$83X + 241C = 22 \quad (3)$$

$$250X + 1457C = 105 \quad (4)$$

From the above C=0.053 and X=0.11 are obtained respectively. Thus, the amounts of carrageenan and xanthan gum to be added to liquid mixture are 0.053% and 0.11% by weight.

The buffer salt to be preferably added in the invention is for stabilization of milk ingredient, which may be any of phosphates, polyphosphates, sodium citrate and sodium carbonate. The amount is preferably in the range of 0.05–0.5% by weight.

The foaming agent may be used when it is particularly desired to improve foaming formation when shaking, among which are enzymatically hydrolyzed product of casein, egg white and soy protein. Above all said hydrolyzed product of casein is preferable in the view points of taste, color and thermal stability. The foaming agent is added in the range of 0–0.6% by weight.

Of course flavor and coloring agent may be used for preparing milk shake beverage of vanilla, chocolate, coffee, strawberry, cocoa and various fruit tastes.

Experiment 1

How the amount of guar gum to be added affects on foaming ability, foam stability and appearance of the product was studied as follows.

(1) Preparation of liquid mixture

Fifty parts raw milk, 8 parts powdered skim milk, 4.3 parts sucrose and, 0.25 parts sodium citrate were dissolved in water, to which a previously prepared solution by dissolving guar gum, carrageenan and xanthan gum in the respective amounts as shown in Table 1 in hot water of about 60° C. was added to be totally 100 parts so as to prepare four sorts of liquid mixture each of 30 kg. Each liquid mixture was heated at 140° C. for about 3 seconds by means of the plate type heat exchanger for the purpose of sterilization, cooled to 80°–85° C., homogenized at 250 kg/cm$^2$, and taken out of the heat exchanger after cooling below 10° C. The liquid mixture just taken out were used as samples.

(2) Experimental Methods (a) Determination of Overrun

Each 130 ml sample cooled at 10° C. was taken into the container made of polyethylene and having 300 ml capacity to be shaken for 1 min. by means of the shaking machine. Immediately thereafter the respective sample was transferred into the messcylinder to read graduations at the upper level of foam, which is represented by $V_{Fo}$. Determinations were repeated with the respective passage of time to read graduations ($V_F$) at the upper level of foam and graduations ($V_L$) at the boundary between foam and liquid.

Overrun may be calculated according to the following equation;

$$\text{Overrun (\% by volume)} = \frac{V_{Fo} - 130}{130} \times 100$$

When foam is stably kept owing to the effect of used gums, the value of overrun is to be higher.

(b) Determination of Volume of Foam

Volume of foam may be calculated from the following equation;

$$\text{Volume of foam (ml)} = V_F - V_L$$

Since volume of foam is decreased with the passage of time, the determination were made immediately after shaking, 2 min., 10 min., and 20 min. respectively thereafter. When foam is stable owing to the used gums, volume of foam is to be substantially unchanged even when a long time lapsed.

(c) Determination of Viscosity

Viscosity was determined in respect of the four samples cooled at 10° C. according to the conventional method using viscometer.

(d) Appearance Observation

Samples were observed with naked eye to judge whether coagulation existed or not as follows;

(−) Sample is homogeneous and contains no coagulation, (±) Sample has a little coagulation formed, (tr.) sample has a little but clearly recognizable coagulation formed, and (+) Sample has coagulation formed.

As seen from following Table 1, the effect of guar gum addition on overrun and volume of foam was studied by changing the amount of added guar gum in the range of 0–0.12% by weight with fixing the amount of added carrageenan and xanthan gum respectively at 0.02% and 0.05% by weight.

It was generally found that increase of amount of added guar gum caused increase of viscosity, improvement of foam stability and lowering of foaming ability.

There was nothing among the samples which satisfied conditions aimed by the inventors that overrun is above 60% by weight and volume of foam after 10 min. is above 70 ml.

It was confirmed that increasing the amount of guar gum to be added more than 0.07% by weight caused forming of coagulation in the liquid mixture when subjecting to desired sterilization at a very high temperature as of 140° C. This was confirmed also by other experiments made with changing the amounts of added carrageenan and xanthan gum.

Accordingly the amount of added guar gum is to be restricted below 0.07% by weight according to the invention.

TABLE 1

|  | Sample Nos. | | | |
|---|---|---|---|---|
|  | 1 | 2 | 3 | 4 |
| [Added Gum Amount] | | | | |

TABLE 1-continued

|  | Sample Nos. | | | |
|---|---|---|---|---|
|  | 1 | 2 | 3 | 4 |
| Guar gum (% by weight) | 0 | 0.06 | 0.07 | 0.12 |
| Carrageenan (% by weight) | 0.02 | 0.02 | 0.02 | 0.02 |
| Xanthan gum (% by weight) | 0.05 | 0.05 | 0.05 | 0.05 |
| Overrun (% by volume) | 65.4 | 61.5 | 58.5 | 47.7 |
| [Volume of Foam (ml)] | | | | |
| After 2 min. | 110 | 105 | 105 | 105 |
| After 10 min. | 37 | 40 | 42 | 56 |
| After 20 min. | 0 | 0 | 7 | 18 |
| Viscosity (cp) | 50.5 | 59.0 | 62.2 | 70.0 |
| Appearance | (−) | (−) | (±) or (tr) | (+) |

Experiment 2

The samples were prepared according to the same method as in Experiment 1 but with changing the amount of gums as in following Table 2 and the experiment was similarly made.

As seen from Table 2, every sample showed overrun higher than 60% by volume but as to samples Nos. 5 and 8 volume of foam after 10 min. was less than 70 ml.

It was found that carrageenan had to be added at least in the amount of 0.025% by weight, which was confirmed also by other experiments in which the amounts of added guar gum and carrageenan were made different from the values given in Table 2.

TABLE 2

|  | Sample Nos. | | | | | |
|---|---|---|---|---|---|---|
|  | 5 | 6 | 7 | 8 | 9 | 10 |
| [Added Gum Amount] | | | | | | |
| Guar Gum (% by weight) | 0.04 | 0.04 | 0.04 | 0.04 | 0.04 | 0.04 |
| Carrageenan (% by weight) | 0.02 | 0.025 | 0.03 | 0.02 | 0.025 | 0.03 |
| Xanthan Gum (% by weight) | 0.09 | 0.09 | 0.09 | 0.15 | 0.15 | 0.15 |
| Overrun (% by volume) | 65.4 | 68.5 | 65.4 | 64.6 | 63.1 | 60.0 |
| [Volume of Foam (ml)] | | | | | | |
| After 2 min. | 135 | 139 | 141 | 141 | 138 | 135 |
| After 10 min. | 41 | 74 | 92 | 63 | 88 | 93 |
| After 20 min. | 7 | 65 | 86 | 32 | 85 | 88 |
| Viscosity (cp) | 61.0 | 61.0 | 62.0 | 102 | 103 | 105 |
| Appearance | (−) | (−) | (−) | (−) | (−) | (−) |

Experiment 3

How the amount of carrageenan and xanthan gum to be added effects on overrun and volume of foam was studied as follows.

Twenty four sorts of test samples were prepared similarly to Experiment 1 exept that the amount of xanthan gum to be added was varied from 0% to 0.15% by weight every 0.03% by weight increment and that of carrageenan was varied from 0.03% to 0.08% by weight every 0.01% or 0.02% by weight increment, with fixing the amount of added guar gum at 0.04% by weight, so as to similarly carry out the experiments.

The results are partly shown in Table 3. There were found 15 sorts of samples satisfying that overrun is above 60% by volume and volume of foam after 10 min. is more than 70 ml. Based on the results shown in Table 3, multiple regression analysis of overrun (OR) and volume of foam (ST) was made in respect of the amounts of added carrageenan (C) and xanthan gum (X) to obtain the results as shown in Table 4.

TABLE 3

| Sample Nos. | Xanthan Gum Addition Amount: X (% by weight) | Carrageenan Addition Amount: C (% by weight) | Overrun OR (% by weight) | Volume of Foam After 10 min.: ST (ml) | Remarks |
|---|---|---|---|---|---|
| 11 | 0 | 0.04 | 73.8 | 70 | |
| 12 | 0 | 0.06 | 65.4 | 101 | |
| 13 | 0 | 0.08 | 60.0 | 130 | |
| 14 | 0.03 | 0.04 | 69.2 | 88 | |
| 15 | 0.03 | 0.06 | 66.9 | 121 | |
| 16 | 0.03 | 0.07 | 63.8 | 116 | |
| 17 | 0.06 | 0.03 | 69.2 | 72 | |
| 18 | 0.06 | 0.04 | 69.2 | 85 | |
| 19 | 0.06 | 0.06 | 63.8 | 120 | |
| 20 | 0.09 | 0.03 | 65.4 | 92 | Same with Sample No. 7 |
| 21 | 0.09 | 0.04 | 65.4 | 77 | |
| 22 | 0.09 | 0.05 | 65.4 | 120 | |
| 23 | 0.12 | 0.03 | 66.2 | 84 | |
| 24 | 0.12 | 0.04 | 61.5 | 111 | |
| 25 | 0.15 | 0.03 | 60.0 | 93 | Same with Sample No. 10 |

TABLE 4

(Overrun)

| | |
|---|---|
| Constant | 82.05 |
| Coefficient of X | −82.92 |
| Coefficient of C | −240.52 |
| Coefficient of Corelation | 0.88 |
| Contributing proportion | 76.88% |

| | Sum of Squares | Degree of Freedom | Mean Square | Variance |
|---|---|---|---|---|
| Regression | 149.34 | 2 | 74.67 | 19.95 |
| Error | 44.91 | 12 | 3.74 | |
| Total | 194.25 | 14 | | |

Significance Significant by 1% level of significance (Volume of Foam)

| | |
|---|---|
| Constant | 15.17 |
| Coefficient of X | 250.46 |
| Coefficient of C | 1456.55 |
| Coefficient of Corelation | 0.91 |
| Contributing | 82.80% |

TABLE 4-continued proportion

|  | Sum of Squares | Degree of Freedom | Mean Square | Variance |
|---|---|---|---|---|
| Regression | 4506.95 | 2 | 2253.48 | 28.88 |
| Error | 936.38 | 12 | 78.03 |  |
| Total | 5443.33 | 14 |  |  |
| Significance | Significant by 1% level of significance | | | |

(Remark)
Rounded at third decimal place

Following equations of multiple regression as to overrun and volume of foam may be obtained by rounding numeric values in Table 4.

As to overrun (OR);

$$OR = -83X - 241C + 82 \quad (a)$$

$$\therefore 83X + 241C = 82 - OR \quad (1)$$

As to volume of foam (ST);

$$ST = 250X + 1457C + 15 \quad (b)$$

$$\therefore 250X + 1457C = ST - 15 \quad (2)$$

Since the invention intends to make overrun at least 60% by volume and volume of foam more than 70 ml after 10 min. $OR \geq 60$ and $ST \geq 70$ are respectively introduced into equations (1) and (2), which are as follows;

$$83X + 241C \leq 22 \quad (c)$$

$$250X + 1457C \geq 55 \quad (d)$$

As to Experiment 2, it was found preferable that amount of added carrageenan (C) had to be at least 0.025% by weight which is represented by $C \geq 0.025$.

In the accompanying drawing, in which carrageenan addition rate (C) is taken as ordinate and xanthan gum addition rate (X) as abscissa. In said coordinates, lines fulfilling said formula as well as equations (c) and (d) are shown.

When the amount of added xanthan gum is less than that obtained at a point where the line fulfilling C=0.025 crosses with the line representing equation (d), carrageenan shall be used in the amount represented by said equation (d) according to the invention.

Experiment 4

Samples Nos. 15 and 21 as prepared in Experiment 3 were aseptically poured into the respective sterilized bottles, which were stored at a temperature of 5°-10° C. After 30 days, 60 days and 90 days, experiments on overrun, volume of foam, viscosity and coagulation of the bottled products were respectively observed according to the methods as in Experiment 1, and further pH value, lactic acidity (% by weight) and taste were determined by the following methods in order to study how the product is changed with the lapse of time.

(a) Determination of pH Value

The samples were warmed to be of 20° C. and pH value was measured with using pH meter F-7II (Horiba Seisakusho).

(b) Determination of Lactic Acidity

To 9 g sample 9 ml water eliminating carbon dioxide was added for dilution, to which 0.5 ml phenolphthalein was added as indicator. Titration was carried out to be stopped with aiming at the moment where faint scarlet did not disappear for 30 seconds with using 0.1N sodium hydroxide. From the titrated amount, percentage of lactic acid relative to 100 g sample is calculated so as to show the numerical value as lactic acidity.

(c) Taste

Samples were subjected to organoleptic test by 10 persons, of which result were shown in following Table 5.

TABLE 5

|  | Sample Nos. | | | | | | | |
|---|---|---|---|---|---|---|---|---|
|  | 15 | | | | 21 | | | |
| [Added Gum Amount] (% by weight) | | | | | | | | |
| Guar Gum | 0.04 | | | | 0.04 | | | |
| Carrageenan | 0.06 | | | | 0.04 | | | |
| Xanthan Gum | 0.03 | | | | 0.09 | | | |
| Preservation Time (Day) | 0 | 30 | 60 | 90 | 0 | 30 | 60 | 90 |
| Overrun (% by volume) | 66.9 | 64.6 | 66.2 | 65.4 | 65.4 | 65.4 | 62.3 | 63.8 |
| Volume of Foam (ml) | | | | | | | | |
| After 2 min. | 144 | 142 | 146 | 144 | 148 | 150 | 149 | 150 |
| After 10 min. | 121 | 118 | 120 | 121 | 77 | 79 | 77 | 77 |
| After 20 min. | 80 | 80 | 80 | 81 | 70 | 70 | 70 | 70 |
| Viscosity (cp) | 35.0 | 33.0 | 33.0 | 34.0 | 61.0 | 60.0 | 65.0 | 62.0 |
| pH | 6.50 | 6.50 | 6.48 | 6.48 | 6.50 | 6.48 | 6.52 | 6.48 |
| Lactic Acidity (% by weight) | 0.20 | 0.20 | 0.20 | 0.20 | 0.20 | 0.20 | 0.20 | 0.21 |
| Coagulation | (−) | (−) | (−) | (−) | (−) | (−) | (−) | (−) |
| Taste | good | good | good | good | good | good | good | good |

As seen from said Table, the samples according to the invention can provide milk shake beverage satisfactory in all of overrun, volume of foam, viscosity, coagulation and taste despite that said samples were stored for 90 days at a temperature of 5°-10° C.

Experiment 5

This experiment was carried out for the purpose of comparing milk shake beverage according to the invention (Example 1 to be referred to hereinafter) with the similar 10 products (provided by 5 manufacturers) available in the market as to viscosity, overrun and volume of foam.

It is added that the products other than that of the invention and the marketed products E were not sterilized so that storage for a long time thereof was not possible. All products other than said marketed product E were of the type that shaking the container could cause foam on and in the contained drink.

The results are shown in following Table 6.

The products in which overrun after shaking was above 60% by volume and volume of foam after 10 min. was more than 70 ml were the product according to the invention and marketed products B and D. Since these marketed products were not sterilized, however, they will not be able to show such overrun and volume of foam as shown in said Table when sterilized. On the other hand, as to the marketed product E which was sterilized as referred to above the foam stability was not good so that the volume of foam was decreased to 45 ml after only 5 min. after shaking and almost disappeared so as not to be recognizable after 10 min. lapse.

From the above, it has been confirmed that the product of the invention can be stored for a long time and shows satisfactory overrun and volume of foam.

spectively in the amount of 170 ml to obtain 10,000 packed milk shake beverage.

According to the same methods as shown in Experiment 1, the products were found to have overrun of 65.4% by volume when shaking, volume of foam of 120 ml after 10 min., viscosity of 88 cp, good appearance and taste. After storage of 90 days at a temperature of 5°–10° C., no deterioration of the product was observed.

EXAMPLE 2

It was intended to provide a milk shake beverage contained in a container, of which overrun is 70% by volume and volume of foam is 80 ml after 10 min.

According to the same method as shown in Example 1, the preferable amounts of xanthan gum and carrageenan to be added were obtained as 0.031% and 0.039% by weight respectively.

In 1000 kg hot water of 50° C., 116 kg powdered whole milk, 160 kg powdered skim milk, 86 kg sucrose, 6 kg enzmatically hydrolyzed casein, 5 kg sodium citrate and 1 kg natural red color were dissolved. Separately prepared solution of 1.28 kg guar gum, 0.78 kg carrageenan and 0.62 kg xanthan gum in 300 kg hot water of 60° C., and 2 kg strawberry flavor were added to prepare 2,000 kg liquid mixture by further adding water.

TABLE 6

| | | Sample | | | | | | | | |
|---|---|---|---|---|---|---|---|---|---|---|
| | Invention Vanilla | Marketed A | | Marketed B | | | Marketed C | | | Marketed D Vanilla | Marketed E Straw Berry |
| | | Straw Berry | Chocolate | Vanilla | Straw Berry | Yogurt | Vanilla | Straw Berry | Chocolate | | |
| Viscosity (cp) | 88 | 67 | 87 | 39 | 45 | 20 | 23 | 95 | 350 | 107 | 9 |
| Overrun (% by volume) | 65 | 66 | 53 | 71 | 71 | 56 | 72 | 78 | 53 | 69 | 68 |
| Volume of Foam (ml) | | | | | | | | | | | |
| After 2 min. | 146 | 84 | 68 | | | | 96 | 136 | 123 | 124 | 93 |
| After 3.5 min. | | | | 136 | 136 | 102 | | | | | |
| After 5 min. | 128 | 8 | 5 | 128 | 126 | 96 | 24 | 105 | 102 | 106 | 45 |
| After 10 min. | 120 | — | — | 106 | 93 | 83 | — | 50 | 79 | 83 | — |
| After 20 min. | 104 | | | 57 | 23 | 69 | . | 3 | 32 | 35 | |
| After 25 min. | 99 | | | 30 | — | 58 | | — | 15 | — | |

Remark; — means that foam is disappeared so that measurement is impossible

EXAMPLE 1

It was intended to provide a milk shake beverage contained in a container, of which overrun is 60% by volume when shaking and volume of foam is 120 ml after 10 min.

When said numerical values 60 and 120 are introduced into equations (1) and (2) to obtain followings;

$$83X + 241C = 22$$

$$250X + 1457C = 105$$

From the above, X (amount of xanthan gum to be added) and C (amount of carrageenan to be added) are to be 0.11 and 0.053 respectively, which means it is preferable to add xanthan gum and carrageenan respectively in the amount of 0.11% and 0.053% by weight.

In 350 Kg water, 160 Kg powdered skim milk, 86 kg sucrose and 5 kg sodium citrate were dissolved, to which 1000 kg raw milk was added. Solution of 1.28 kg guar gum, 1.06 kg carrageenan and 2.20 kg xanthan gum in 300 kg hot water of 60° C. and 2 kg vanilla flavor were further added to prepare 2,000 kg liquid mixture by further adding water.

The mixture was sterilized by means of plate type heat exchanger at a temperature of 140° C. for about 3 seconds, aseptically homogenized at 200 kg/cm² and 85° C., cooled below 10° C., and aseptically poured into sterilized polystyrene container of 300 ml capacity re- The mixture was sterilized by means of plate type heat exchanger at 140° C. for about 3 seconds, aseptically homogenized at 200 kg/cm² and 85° C., cooled below 10° C. and aseptically poured into sterilized polystyrene container of 300 ml capacity respectively in the amount of 170 ml to obtain 10,500 packed milk shake beverage.

According to the same product as shown in Experiment 1, the products were found to have overrun of 70.8% by volume when shaking, volume of foam of 85 ml after 10 min., viscosity of 28 cp, good appearance and taste. After storage of 90 days at a temperature of 5°–10° C., no deterioration of the products was observed.

What is claimed is:

1. In a process for preparing a milk shake beverage, including the steps of sterilizing a liquid mixture containing a milk constituent and other constituents sufficient to make a non-frozen, drinkable, foamable milk shake beverage upon shaking said liquid mixture in a container, aseptically homogenizing the sterilized mixture, aseptically filling the homogenized mixture into a container and hermetically sealing the container, the improvement comprising; prior to said sterilizing, adding to the mixture guar gum in a proportion of at least 0.04 to 0.07% by weight, based on the weight of the mixture, and kappa carrageenan and xanthan gum in respective proportions, calculated from the following equations (1) and (2), and sucrose in a proportion of 4 to 10% by weight based on the weight of the mixture, and sterilizing the mixture at a temperature of 135° to 150° C. for 2 to 5 seconds, whereby the milk shake beverage having at least 60% by volume in overrun and at least 70 ml of foam per 130 ml of the mixture is obtained;

$$83X + 241C = 82 - OR \qquad (1)$$

$$250X + 145C = ST - 15 \qquad (2)$$

wherein C stands for weight percent, based on the weight of the mixture, of kappa carrageenan added to the mixture and is at least 0.025, X stands for weight percent based on the weight of the mixture, of xanthan gum added to the mixture and is at least 0.03, OR stands for volume percent of overrun in the final product and is at least 60, and ST stands for milliliters of foam per 130 ml of the mixture, said foam being measured by shaking the final product and thereafter allowing it to stand for 10 minutes, and is at least 70.

* * * * *